(12) United States Patent  
Schrock et al.

(10) Patent No.: US 8,892,988 B1  
(45) Date of Patent: Nov. 18, 2014

(54) INTEGRATED USER INTERFACE

(75) Inventors: Jasson A. Schrock, Mountain View, CA (US); Richard B. Leider, San Francisco, CA (US)

(73) Assignee: Google Inc., Mountain View, CA (US)

(*) Notice: Subject to any disclaimer, the term of this patent is extended or adjusted under 35 U.S.C. 154(b) by 1159 days.

(21) Appl. No.: 12/639,905

(22) Filed: Dec. 16, 2009

(51) Int. Cl.  
*G06F 17/00* (2006.01)

(52) U.S. Cl.  
USPC ............................ 715/204; 715/201; 715/243

(58) Field of Classification Search  
USPC .......... 715/200, 201, 204, 234, 243, 255, 273  
See application file for complete search history.

(56) References Cited

U.S. PATENT DOCUMENTS

| | | | | |
|---|---|---|---|---|
| 6,874,152 | B2* | 3/2005 | Vermeire et al. | 719/330 |
| 7,266,434 | B2* | 9/2007 | Mc Cullough et al. | 701/36 |
| 2001/0044855 | A1* | 11/2001 | Vermeire et al. | 709/310 |
| 2003/0009771 | A1* | 1/2003 | Chang | 725/135 |
| 2005/0102077 | A1* | 5/2005 | Mc Cullough et al. | 701/36 |
| 2008/0031475 | A1* | 2/2008 | Goldstein | 381/151 |
| 2008/0209330 | A1* | 8/2008 | Cruver | 715/733 |
| 2009/0043813 | A1* | 2/2009 | Moore et al. | 707/104.1 |

* cited by examiner

*Primary Examiner* — Stephen Hong  
*Assistant Examiner* — Gregory J Vaughn  
(74) *Attorney, Agent, or Firm* — Fenwick & West LLP (57) ABSTRACT

A system and method for a content player to determine and retrieve a graphical asset associated with a player feature supported by the content. The content player downloads the graphical assets, integrates the graphical assets in the player's graphical user interface, and displays the graphical assets as part of the player's user interface. The user can now select one of the graphical assets to enable the player feature associated with the graphical asset.

30 Claims, 8 Drawing Sheets

INTEGRATED USER INTERFACE

BACKGROUND

1. Field of Art

The present invention relates generally to web-based multimedia players, and more particularly to a graphical user interface for the web-based multimedia players.

2. Description of the Related Art

Content providers serve their multimedia content to end users through content hosting sites like YOUTUBE. Currently, the content providers have minimal control over the multimedia player displaying the content and the features available on the multimedia player for the content. For example, the content providers cannot choose if closed captioning should be available with their content. Additionally, the content provider cannot specify the graphical interface available for the features supported by the content. On the other hand, the content hosting sites face the challenges of keeping the multimedia player user friendly and avoiding cluttering the player with excessive graphical user interface elements that distract the user from enjoying the content.

SUMMARY

The present invention enables a content provider to choose a graphical asset for a player feature that should be displayed as part of the player's graphical user interface when the content provider's content is played. The content provider populates a module descriptor with information about the features supported by the content and the graphical asset that should be displayed on the player for the user to access each feature. The content provider also provides a download location for the graphical assets in the module descriptor.

When a user requests the content provider's content through a content player, the content player retrieves a module descriptor for the content from the content hosting server, determines the graphical assets for the content and the player features associated with the graphical assets, downloads the graphical assets, integrates the graphical assets in the player's graphical user interface, and displays the graphical assets as part of the player's user interface. The user can then select one of the integrated graphical assets to enable the player feature associated with the graphical asset.

The features and advantages described in the specification are not all inclusive and, in particular, many additional features and advantages will be apparent to one of ordinary skill in the art in view of the drawings, specification, and claims. Moreover, the language used in the specification has been principally selected for readability and instructional purposes, and may not have been selected to delineate or circumscribe the disclosed subject matter.

The figures depict various embodiments of the present invention for purposes of illustration only. One skilled in the art will readily recognize from the following discussion that alternative embodiments of the instructions and methods illustrated herein may be employed without departing from the principles of the invention described here.

DETAILED DESCRIPTION

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

System Overview

A user requests a webpage with an embedded multimedia file from a browser and the browser receives a container file as part of the webpage. The container file is internally linked to the multimedia server and causes the browser to download the multimedia file to the browser. The multimedia content being downloaded is displayed on the multimedia player within the webpage as the content becomes available.

Figure 1:
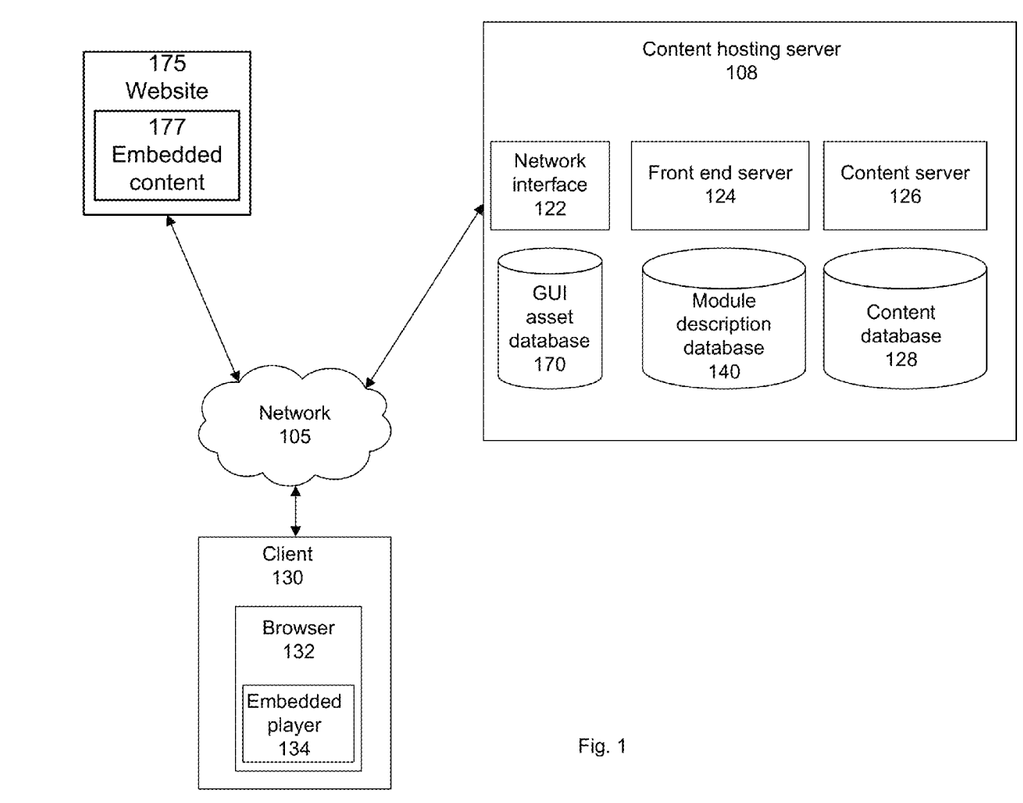
FIG. 1 is a block diagram of a system environment for presenting multimedia content and corresponding graphical user interface on a multimedia player according to one embodiment of the invention.

FIG. 1 is a block diagram of a system environment 100 for presenting multimedia content and corresponding graphical user interface on a multimedia player. As illustrated in FIG. 1, a client 130 is communicatively coupled to a content hosting server 108 through network 105. Other conventional features, such as firewalls, load balancers, application servers, failover servers, site management tools, and so forth are not shown in FIG. 1 so as to more clearly illustrate the features of the system.

Each of the various servers described in FIG. 1 is implemented as a server program executing on server-class computer comprising a CPU, memory, network interface, peripheral interfaces, and other well-known components. The computers themselves in various embodiments run an operating system such as LINUX, Microsoft Windows, or Apple OS X, have generally high performance CPUs, 1 GB or more of memory, and 100 GB or more of disk storage. Of course, other types of computers can be used, and as more powerful computers are developed in the future, they can be configured in accordance with the teachings here. The functionality implemented by any of the elements can be provided from computer program products that are stored in tangible computer accessible storage mediums (e.g., RAM, hard disk, or optical/magnetic media) and accessed by the computer(s). Generally, functions described in one embodiment as being performed on the server side can also be performed on the client side in other embodiments if appropriate. Additionally, the functionality attributed to a particular component can be performed by different or multiple components operating together.

Referring to FIG. 1 again, the content hosting server 108 includes a network interface 122, a front end server 124, a content server 126, a content database 128, a module description database 140, and a GUI asset database 170. Examples of a suitable content hosting server 108 for implementation of the system include the YOUTUBE™ and GOOGLE VIDEO™ servers; other content hosting sites are known as well, and can be adapted to operate according the teaching disclosed herein.

The front end server 124 receives the users' requests for a multimedia file, determines and retrieves the module descriptor for the multimedia file from module description database 140, and transmits the retrieved module descriptor to client 130. In one embodiment, as described below, module descriptor identifiers rather than the descriptors themselves are retrieved from database 140. The front end server 124 also forwards the request for multimedia file to content server 126 and content server 126 transmits the file to client 130.

Content server 126 receives uploaded multimedia content from content providers and transmits requested content to client 130. Content may be uploaded to content server 126 via the Internet from a personal computer, through a cellular network from a telephone or PDA, or by other means for transferring data over network 105 known to those of ordinary skill in the art. Content may be transmitted or downloaded from content server 126 in a similar manner. In one embodiment media content is transmitted as a file download to a client 130, and in an alternative embodiment, media content is streamed to client 130. The means by which media content is received by content server 126 need not match the means by which it is delivered to client 130. For example, a content provider may upload a multimedia file via a browser on a personal computer, whereas client 130 may receive that content as a data stream.

The content database 128 stores multimedia content received by content server 126. In one embodiment, the content database 128 also stores corresponding metadata associated with the content like content ID, content creator, content title, label, genre, and content duration.

The module description database 140 stores module descriptors associated with the multimedia content. The module descriptors are used by client 130 to determine the features supported by the requested content, the graphical user interface associated with the feature, and a download location for the associated graphical user interface. The client 130 can use this information to download the graphical user interface or the required parts of the graphical user interface, integrate the graphical user interface into the embedded player 134 on client 130, and display the graphical user interface on embedded player 134 while displaying the requested multimedia file. The module description database is described below in FIG. 2.

The GUI asset database 170 stores graphical assets, i.e. various parts of the graphical user interface, displayed to the user on client 130. In one embodiment, the GUI asset database 170 also stores secondary menu modules associated with a graphical asset. The secondary menu modules include information for secondary menus that are displayed when the associated graphical asset is displayed and selected on embedded player 134. The information includes the options available in the secondary menu, player features associated with those options, and the placement of the secondary menu in relation to the graphical asset.

In one embodiment, module descriptors in module description database 140 include the location of this GUI asset database 170 as the download location for a requested graphical asset.

The network 105 represents communication pathways between the client 130, websites 175 and content hosting server 108. The network 105 is typically the Internet, but can also utilize dedicated or private communications links that are not necessarily part of the Internet. In one embodiment, the network 105 uses standard communications technologies, protocols, and/or interprocess communications techniques. Thus, the network 105 can include links using technologies such as Ethernet, 802.11, integrated services digital network (ISDN), digital subscriber line (DSL), asynchronous transfer mode (ATM), etc. Similarly, the networking protocols used on the network 105 can include the transmission control protocol/Internet protocol (TCP/IP), the hypertext transport protocol (HTTP), the simple mail transfer protocol (SMTP), the file transfer protocol (FTP), the short message service (SMS) protocol, etc. The data exchanged over the network 105 can be represented using technologies and/or formats including the hypertext markup language (HTML), the extensible markup language (XML), etc. In addition, all or some of the links can be encrypted using conventional encryption technologies such as the secure sockets layer (SSL), HTTP over SSL (HTTPS), and/or virtual private networks (VPNs). In another embodiment, the nodes can use custom and/or dedicated data communications technologies instead of, or in addition to, the ones described above.

A client 130 executes a browser 132 such as GOOGLE CHROME™, MICROSOFT INTERNET EXPLORER™ or MOZILLA FIREFOX™, and connects to front end server 124 via a network 105. While only a single client 130 and browser 132 are shown, it is understood that multiple clients are supported and can be in communication with the content hosting server 108 at any time. The browser 132 can include an embedded player 134 described below in FIG. 3 for playing the content in file formats used in the content hosting server 108. A user can access content from the content hosting server 108 by browsing a catalog of videos, conducting searches on keywords, reviewing playlists from other users or the system administrator (e.g., collections of videos forming channels), or viewing videos associated with particular user group (e.g., communities). A user can also access content indirectly, via embedded content 177 that is accessed via an embedded hyperlink in a third party website 175.

Figure 2:
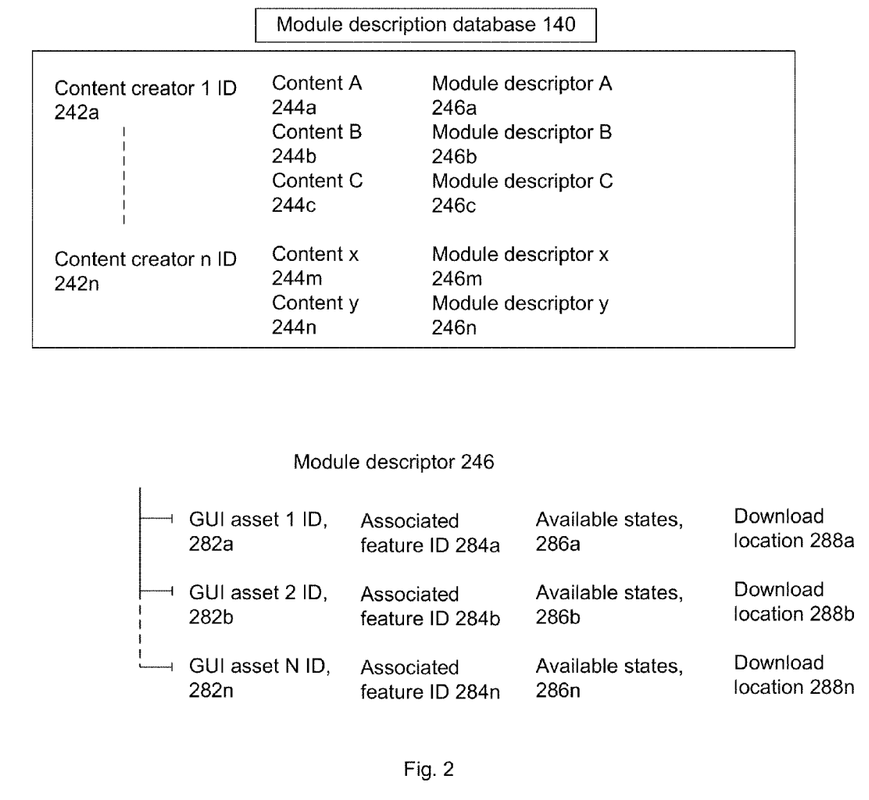
FIG. 2 illustrates the structure and contents of module description database according to one embodiment of the invention.

FIG. 2 illustrates the structure and contents of module description database 140 in accordance with one embodiment. The module description database 140 comprises module descriptors associated with various multimedia files that are sorted by content creators. Accordingly, the module description database 140 includes the content creator ID 242a-n, multimedia files 244a-n associated with each content creator ID 242a-n and module descriptors 246a-n associated with each multimedia file 242a-n.

Each module descriptor 246a-n includes information about the GUI assets associated with various features supported by corresponding multimedia files 244a-n. Accordingly, the module descriptor 246 comprises GUI asset identifier 282a-m, identifier 284a-n for the supported feature associated with the GUI asset, the list of available states 286a-n supported by the identified GUI asset, and a download location 288a-n for the identified GUI asset.

In one embodiment, the module description database 140 includes, instead of the module descriptor 246, a module descriptor identifier (not shown) corresponding to the module descriptor 246. In this embodiment, the module descriptors 246 corresponding to the module descriptor identifiers reside in the embedded player 134.

GUI asset identifier 282a-n can be any reference used to identify the asset. For example, GUI asset identifier 282a-n can be an alphanumeric string used to reference the graphical asset. Similarly, the associated feature identifier 284a-n can be any reference used to identify a feature of the embedded player 134 supported by requested content. For example, an associated feature identifier 284a-n can reference the closed captioning feature of embedded player 134 that is supported by various multimedia files.

Figure 6:
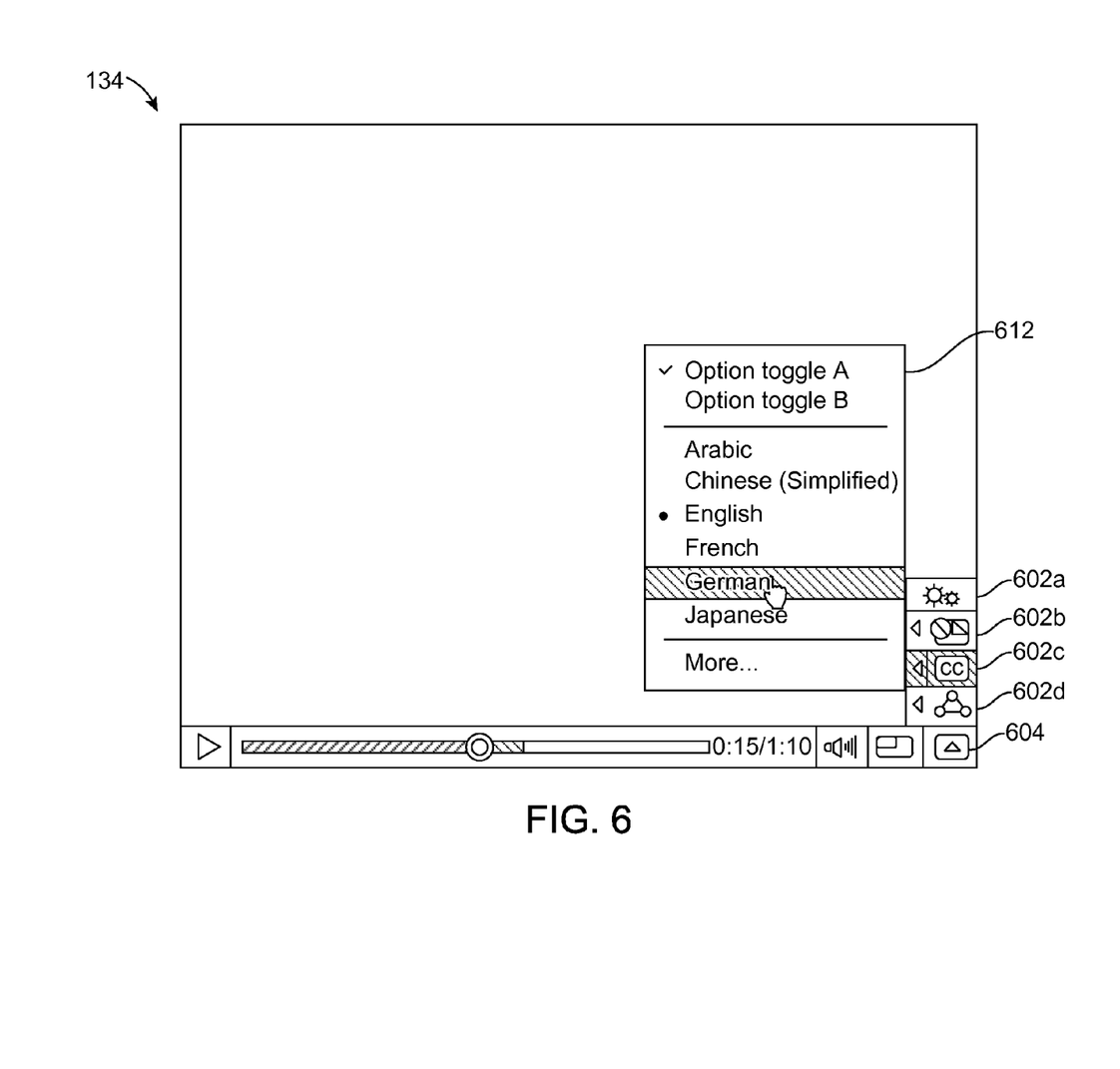
FIG. 6 illustrates the integrated graphical assets as displayed in the embedded player according to one embodiment of the invention.

The available states 286a is a list of states supported by the graphical asset. For example, a graphical asset can support four states: not available, available and on, available and off, and module error. The "not available" state informs a user that a particular feature is not available for requested content. For example, graphical asset 602b in FIG. 6 is in not available state and informs the user that the annotation feature associated with the graphical asset 602b is not available for the requested content. Assets that are in not available state can be displayed in a lighter shade or in a visually distinguishing manner to inform the users that the feature represented by the lighter shaded asset is not available for the content being currently displayed. Alternatively, non-available assets are not displayed at all.

The "available and off" state informs the user that a particular feature is available for the requested content but the feature has not currently been selected by the user. Graphical asset 602d is an example of a graphical asset in available and off state. As shown in FIG. 6, graphical asset 602d is not disabled and the user can select the warp function by selecting the graphical asset 602d. The graphical asset 602d, however, is not selected and therefore is in available and off state.

The "available and on" state informs the user that a particular feature is available for the requested content and the user has selected the feature. For example, graphical asset 602c is in available and on state because the user has selected the closed captioning feature for the content.

The "module error" state informs the user or the embedded player 134 that there was an error associated with the graphical asset. The error can further inform the user or the player 134 that the error occurred in retrieving the graphical asset, integrating the graphical asset, or initializing the feature associated with the graphical asset. In one embodiment, the embedded player 134 determines that the graphical asset is in module error state before displaying the graphical asset and does not display the graphical asset. The user therefore does not see the graphical asset at all. In another embodiment, the embedded player 134 displays the graphical asset with an exclamation mark or other visible indications indicating to the user that the graphical asset is in module error state. In yet another embodiment, the embedded player 134 displays visible indications on the graphical assets that convey to the user whether the error occurred in retrieving the graphical asset, integrating the graphical asset or in initializing the feature associated with the graphical asset.

The module descriptor 246 for a multimedia file can be populated by the content provider or the content host. In one embodiment, the content providers and the content hosting administrator share a pre-determined list of associated feature identifiers 286a-n and available states 286a-n. The predetermined lists enable the content providers to populate the module descriptor 246 in a manner that is understood by the embedded player 134 usually provided by the content host. The predetermined lists can be shared between the content host and content provider in a number ways. For example, the content host can publish a list of associated feature identifiers 286a-n and available states 286a-n.

The content provider can now choose a graphical asset identifier for one of the graphical assets and the associated feature identifier from the pre-determined list and populate the module descriptor 246 with this information. The content provider can populate the module descriptor 246 by editing the module descriptor 246 through a client interface provided by content host.

In one embodiment, the content host determines the features associated with the content and the graphical asset associated with each feature. The content host then populates the graphical asset identifier 282 and the associated feature identifier 286 in module descriptor 246. The associated features can be determined by analyzing the header or metadata of the content file or the content provider can provide the associated feature to the content provider in a text file or by filling an electronic form.

When the embedded player later receives the module descriptor for the content, the embedded player 134 determines the feature associated with the graphical asset from the module descriptor, associates that player feature with the graphical asset, and displays the graphical asset for the user while playing the content. After the user selects the displayed graphical asset, the embedded player 134 calls the associated feature routine to implement the associated feature.

Similarly, the content provider or the content host can provide one or more of the predetermined states 286a-n supported by a graphical asset. The embedded player 134 can later determine the supported states for the graphical asset and set those states when a corresponding event occurs. For example, the embedded player 134 can set the state of the displayed graphical asset to "available and on" when a user selects the displayed graphical asset. In one embodiment, the content provider can also provide instructions to embedded player 134 on how to handle various states. For example, the content provided can instruct the embedded player 134 to display the graphical asset in a different color when the graphical asset is available and on instead of unavailable. The content provider can provide these instructions through APIs (application programming interface) that change the color of the graphical asset and then call APIs of embedded player 134 to implement the feature associated with the graphical asset.

In one embodiment, various module descriptors 246 are pre-configured with one or more of associated feature identifiers 286, available states 286 and download locations 288. These pre-configured module descriptors 246 are associated with pre-configured module descriptor identifiers. The pre-configured module descriptors 246 and their corresponding identifiers reside in embedded player 134. In this embodiment, the content provider or the content host do not populate a module descriptor 246 corresponding to content. Instead, the content provider or content host determines one of the pre-configured module descriptor 246 that corresponds to the content. The content provider or the content host then selects the identifier corresponding to determined module descriptor 246. When the embedded player 134 later receives the identifier corresponding to the determined module descriptor 246, the embedded player 134 retrieves the corresponding module descriptor 246 residing in the embedded player 134. The embedded player 134 then uses the retrieved module descriptor 246 to retrieve and associate a graphical asset with a player feature.

Figure 3:
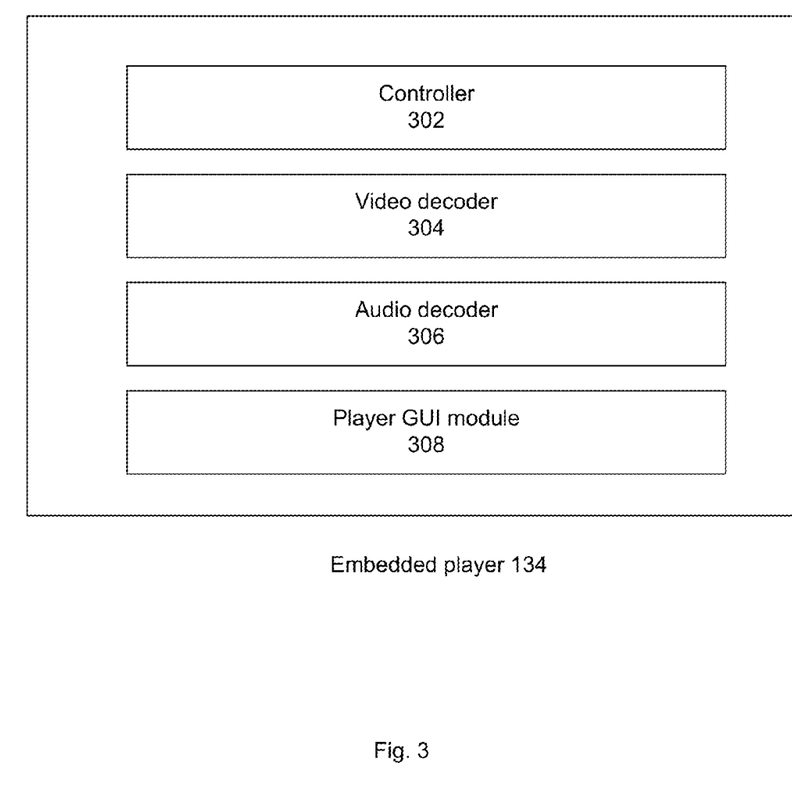
FIG. 3 illustrates an embedded player capable of communicating with content hosting server and displaying the requested content and corresponding graphical user interface according to one embodiment of the invention.

FIG. 3 illustrates an embedded player 134 capable of communicating with content hosting server 108 and displaying the requested content on client 130. The embedded player 134 comprises controller 302, video decoder 304, audio decoder 306 and player GUI module 308. In one embodiment, the embedded player 134 also includes a list of pre-configured module descriptors 246 and their corresponding identifiers. The modules in the embedded player 134 are communicatively coupled to each other through a communication bus.

Controller 302 implements the state machine of embedded player 134 and directs video decoder 304, audio decoder 306 and player GUI module 308 to execute their respective tasks at appropriate times. Controller 302 also communicates with content hosting server 108 to request and receive multimedia content and graphical assets to be displayed on embedded player 134.

Video decoder 304 decodes encoded video files received from content hosting server 108. The video decoder 304 can support a variety of video compression standards like MPEG 1, MPEG 2, MPEG 4 etc.

Audio decoder 306 decodes encoded audio files received from content hosting server 108. The audio decoder 306 can support a variety of audio compression standards like GSM-AMR, AC3, mp1, mp2, mp3 etc.

Player GUI module 308 determines and displays the graphical user interface for the embedded player 134. In one embodiment, the player GUI module 308 receives the module descriptor 246 for the requested content, dynamically determines from the module descriptor 246 the graphical assets supported by the requested content, associates the determined graphical assets with corresponding player features, integrates the graphical assets into the graphical user interface of the embedded player 134 and displays the integrated graphical user interface on client 130 when the requested content is played.

Additionally, the player GUI module 308 conveys the user selections to appropriate modules. For example, when a user selects the pause graphical asset to pause the multimedia file being played, the GUI module 308 relays the user's selection to appropriate modules like video decoder 304 and audio decoder 306.

Method Overview

Figure 4:
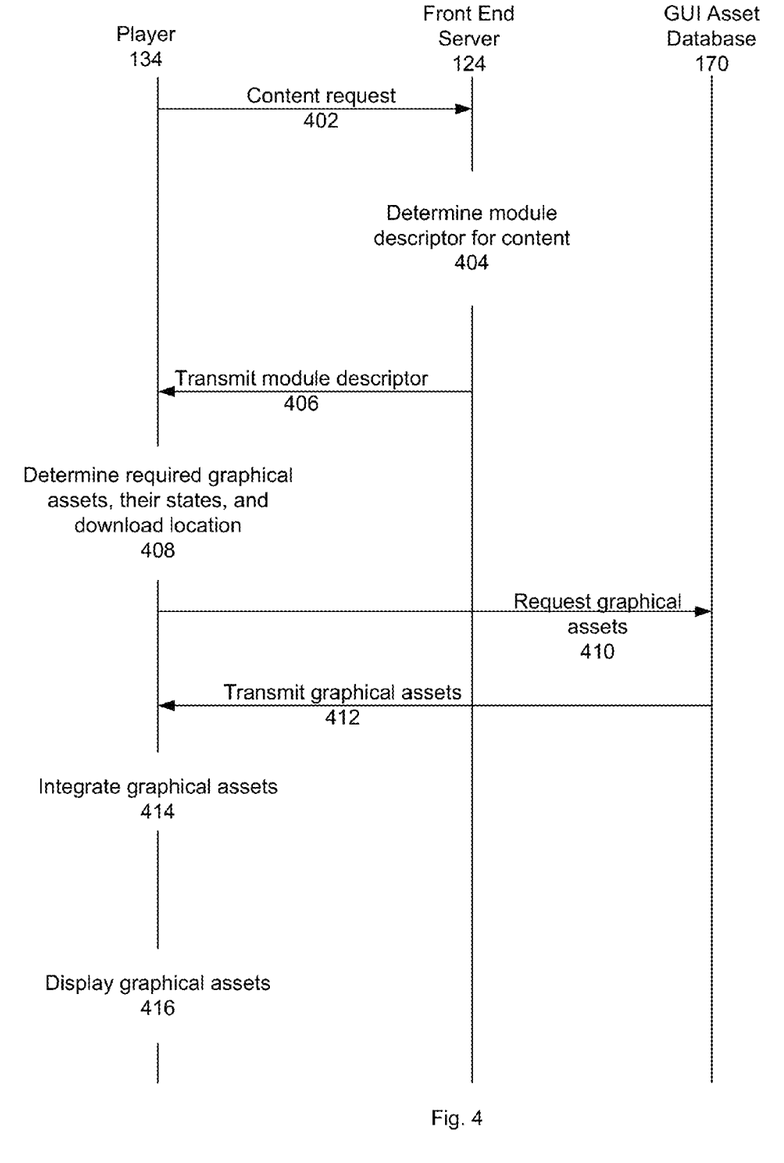
FIG. 4 illustrates a method for determining graphical assets for the requested content and integrating the graphical assets into the graphical user interface of the embedded player according to one embodiment of the invention.

FIG. 4 illustrates a method for determining graphical assets for the requested content and integrating the graphical assets into the graphical user interface of the embedded player 134. The embedded player 134 requests 402 a multimedia file from front end server 124 at content hosting server 108. After receiving the request, the front end server 124 queries 404 module description database 140 to determine the module descriptor 246 or the module descriptor identifier associated with the requested content. Next, the front end server 124 transmits 406 the determined module descriptor 246 to embedded payer 134.

The controller 302 at embedded player 134 receives the module descriptor 246 and forwards the module descriptor 246 to player GUI module 308. In one embodiment, the controller 302 receives a module descriptor identifier and retrieves the corresponding module descriptor 246 residing in the embedded player 134. The player GUI module 308 reads the module descriptor 246 and determines 408 the graphical asset identifier 282, identifier 284 for the feature associated with identified graphical asset, the available states 286 for the identified asset, and a download location 288 where the graphical asset can be downloaded.

In one embodiment, the download location for identified graphical asset is the GUI asset database 170 and the player GUI module 308 requests 410 the identified graphical asset from GUI asset database 170. The GUI asset database 170 retrieves the requested graphical asset and transmits 412 the retrieved graphical asset to player GUI module 308. In one embodiment, the graphical asset is associated with a secondary menu module and the GUI asset database 170 also transmits the associated secondary menu module to player GUI module 308.

The player GUI module 308 initializes the state of the graphical asset and integrates 414 the graphical asset into the graphical user interface of the player 134. The player GUI module 308 also associates the graphical asset with a feature supported by the player. If the graphical asset is associated with a secondary menu module, the player GUI module 308 associates the player feature to display a secondary menu. In one embodiment, the player GUI module 308 associates an API routine in the player with the graphical asset's available and on state. The association informs the controller 302 to call the associated routine whenever the user selects the graphical asset and the graphical asset's state becomes available and on. The GUI module 308 then displays 416 the graphical asset on embedded player 134. When a graphical asset associated with displaying a secondary menu is selected, the player GUI module dynamically builds the secondary menu including entries from the secondary menu module and displays the secondary menu on the embedded player 134. In FIG. 6, secondary menu 612 is one example of secondary menu described above. Player 134 displays secondary menu 612 after graphical asset 602c is displayed and then selected. The secondary menu 612 is described further below in FIG. 6.

Figure 5:
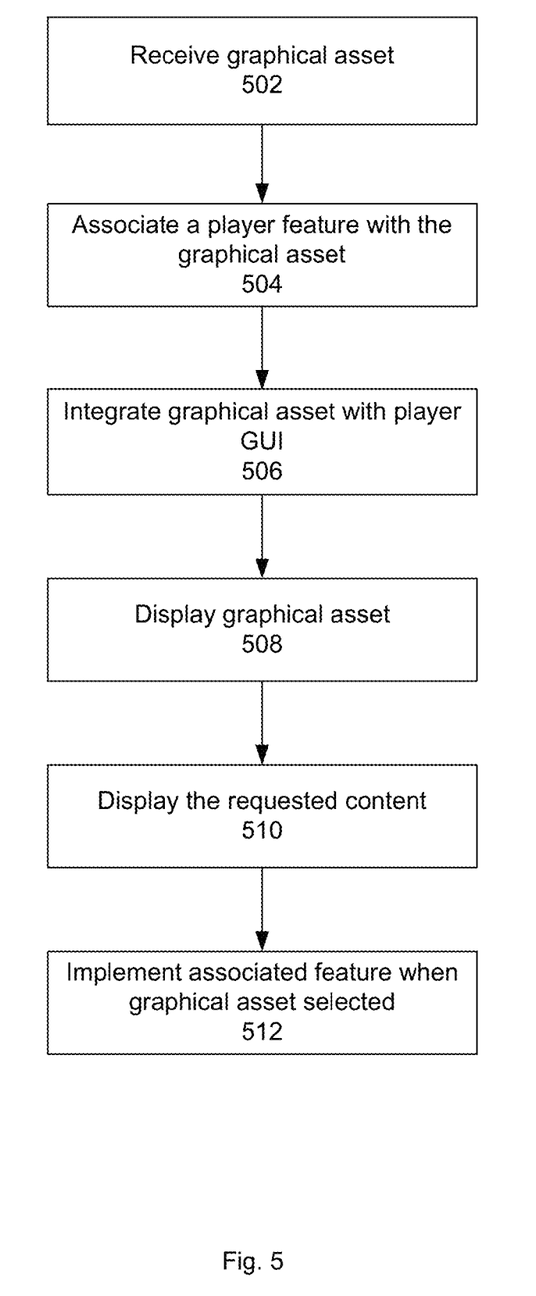
FIG. 5 illustrates the method for implementing the player feature associated with graphical asset after the graphical asset is selected according to one embodiment of the invention.

FIG. 5 illustrates a method for implementing a player feature associated with graphical asset after the user selects the graphical asset in accordance with one embodiment of the present invention. As discussed above, the player GUI module 308 receives 502 the graphical asset, associates 504 a player feature with the graphical asset, and integrates 506 the graphical asset with graphical user interface of player 134.

As described in FIG. 4, the player GUI module 308 determines the graphical assets associated with features in requested content from a module descriptor. One of ordinary skill in the art will understand that module descriptors are one of many ways to determine the associated graphical assets. For example, the request received by the embedded player 134 can include parameters indicating the associated features and graphical assets supported by the requested content. In another example, the received content is accompanied by metadata describing the supported features and graphical assets. In yet another example, the initial part of the received content like a header of a media file includes data indicating the supported features and graphical assets.

Additionally, in some embodiments, the embedded player 134 does not receive graphical assets from a graphical asset database for every content request. For example, the embedded player 134 can store the received graphical asset and its association with a player feature in a player database. In this embodiment, after receiving a request from the user, the embedded player 134 first queries the player database for a graphical asset before requesting the graphical asset from the download location.

In another embodiment, the embedded player 134 does not receive graphical assets from the GUI asset database and instead includes a set of graphical assets and their association with player features. In this embodiment, the received content request or the received content indicates the player features supported by the content and the player GUI module 308 determines the associated graphical assets from the player database.

In embodiments where the graphical asset is present in the player database, the controller 302 skips the step of requesting the graphical asset from GUI asset database 170, the player GUI module 308 retrieves the graphical asset from the player database, associates 504 a player feature with the graphical asset, and integrates 506 the graphical asset with graphical user interface of player 134.

The player GUI module 308 then initializes the state of the graphical asset and displays 508 the graphical asset on player 134. In one embodiment, if the player GUI module 308 determines an error occurred with retrieving or integrating the graphical asset, or initializing the feature associated with the graphical asset, the player GUI module 308 does not display the graphical asset.

Next, controller 302 displays the requested content with the integrated graphical user interface for the user and implements 512 the feature associated with the graphical asset whenever the graphical asset is selected.

The disclosed methods of FIG. 4 and FIG. 5 allow a content provider to control the displayed graphical assets when the embedded player 134 displays the provider's content. The content provider can provide or choose not to provide a graphical asset for a particular feature supported by the content.

On the other hand, the content hosting administrator can control where the graphical asset would be displayed on the player. For example, the content hosting administrator in FIG. 6 has chosen to display the graphical assets on the bottom right. The disclosed methods therefore provide the content providers with the control on graphical assets that are displayed with their content and content hosting administrators with control on where the graphical assets are displayed on the embedded player 134.

Examples of User Interface with Integrated Graphical Assets

FIG. 6 illustrates the integrated graphical assets as displayed in the embedded video player 134. In this illustration, the graphical assets have been received and integrated by the embedded player 134 as shown at steps 414 and 416 of FIG. 4. The user has selected a preferences graphical asset 604 and then selected the closed captioning graphical asset 602*c* from the displayed preference menu. As displayed in FIG. 6, the preferences menu comprises graphical assets 602*a*-*d*. Graphical asset 602*a* and 602*d* are in available and off state (as indicated in the example by the lack of "no" sign in the graphical asset) and therefore inform the user that preferences panel feature and warp feature are available for user's selection. The preference panel feature is described in FIG. 7 below. The warp feature provides a visual representation of multimedia files related to the selected multimedia files. For example, the selected file can be represented as a bubble and files related to the selected file are represented as bubbles in close proximity to the bubble of the selected file.

The graphical asset 602*b* is in a not available state (as indicated in the example by the "no" sign in graphical asset) informing the user that the annotation feature is unavailable for the multimedia file currently being played. The annotation feature allows a user to add interactive commentary to the multimedia files.

Graphical asset 602*c* is in available and on state informing the user that closed captioning feature has been selected. In this embodiment, player feature associated with available and on state of graphical asset 602*c* is displaying the secondary menu 612. The user can choose a language from the displayed secondary menu 612 and the embedded player will then provide closed captioning in the selected language for the displayed multimedia file.

Figure 7:
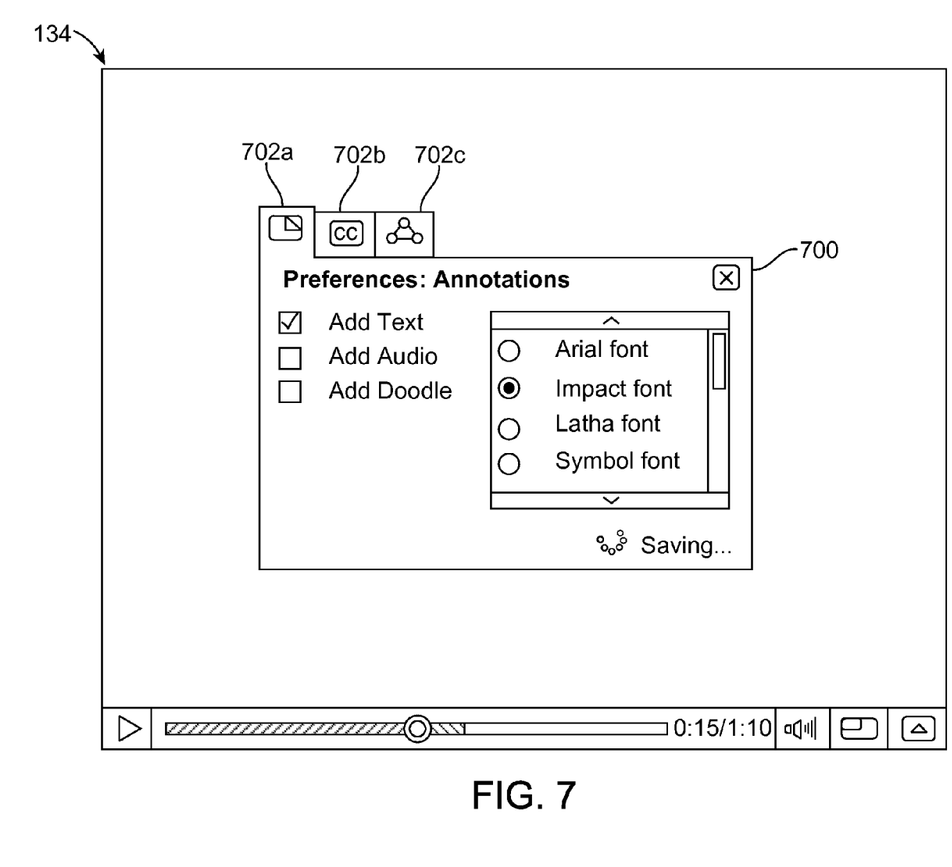
FIG. 7 illustrates the preferences panel as displayed in the embedded player according to one embodiment of the invention.

FIG. 7 illustrates the preferences panel 700 as displayed in the embedded player 134. The embedded player 134 displays the preferences panel 700 after the graphical asset 602*a* is selected. Preferences panel 700 can be used to manage various features of the player through one central panel. The user therefore can access tab 702*a* to manage the annotation feature, tab 702*b* to manage the closed captioning feature and tab 702*c* to manage the warp feature.

Figure 8:
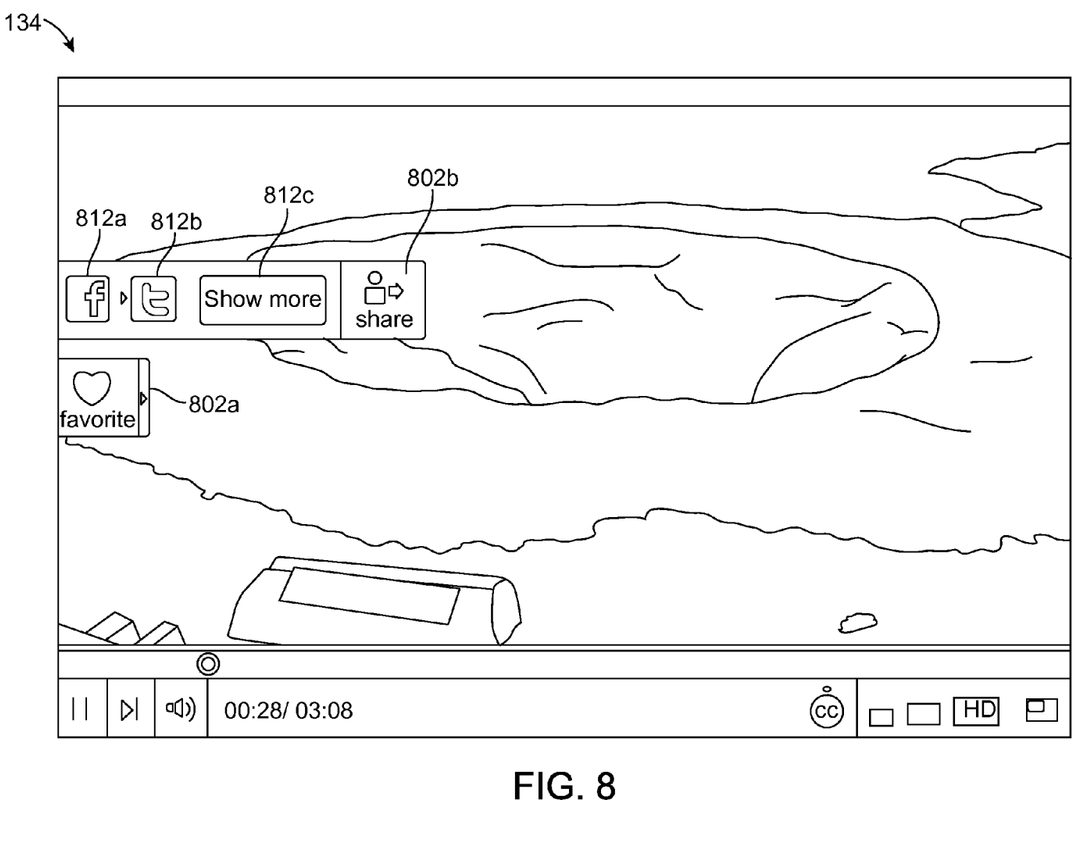
FIG. 8 illustrates the integrated graphical assets as displayed in the embedded player according to another embodiment of the invention.

FIG. 8 illustrates another embodiment of the integrated graphical assets as displayed in the embedded video player 134. In this embodiment, the user has the choice to select from a favorite graphical asset 802*a* and a share graphical asset 802*b*. The player feature associated with the two graphical assets 802*a*-*b* displays a secondary menu in response to selection of graphical asset 802*a* or graphical asset 802*b*. The user in the illustrated case has selected the share graphical asset 802*b* and a secondary menu including graphical assets 812*a*-*c* is displayed in response to selection of graphical asset 802*b*. As illustrated in FIG. 8, the integrated graphical assets can be displayed on various parts of the embedded player 134.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for integrating graphical assets with a player's graphical user interface and displaying the integrated graphical user interface with the requested content through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The invention claimed is:

1. A method for displaying video content comprising:
   requesting, by a client device from a content system, video content;
   in response to the request for the video content, receiving, by the client device from the content system, a module descriptor for the video content, the module descriptor including an identifier for a graphical asset associated with a feature of a multimedia player supported by the video content, the feature activated through the graphical asset;
   requesting, by the client device, the graphical asset from the content system based on the module descriptor;
   receiving, by the client device from the content system, the video content and the graphical asset; and
   displaying, by the client device through the multimedia player, the graphical asset and the video content.

2. The method of claim 1 further comprising:
   receiving a selection of the displayed graphical asset; and
   activating the feature of the multimedia player associated with the selected graphical asset.

3. The method of claim 1 wherein the module descriptor includes an identifier for a graphical asset database comprising the graphical asset.

4. The method of claim 1 wherein the association between the feature and the graphical asset is provided by a content provider.

5. The method of claim 1 wherein the graphical asset supports a not-available state.

6. The method of claim 1 wherein the graphical asset supports an available-and-off state.

7. The method of claim 1 wherein the graphical asset supports an available-and-on state.

8. The method of claim 1 wherein the graphical asset supports an error state.

9. The method of claim 1 wherein displaying the graphical asset further comprises displaying a state of the graphical asset.

10. The method of claim 1 wherein a state of the graphical asset is changed from available-and-off to available-and-on in response to selection of the graphical asset.

11. The method of claim 1 wherein a current state of the graphical asset is set to error in response to receiving an asset retrieval error signifying an error in receiving the graphical asset.

12. The method of claim 1 wherein a current state of the graphical asset is set to error in response to receiving a feature error signifying an error with a multimedia feature associated with the graphical asset.

13. The method of claim 1 wherein a current state of the graphical asset is set to error in response to receiving a multimedia player error signifying an error in integrating the graphical asset with the multimedia player or an error in displaying the graphical asset.

14. The method of claim 1 wherein the graphical asset comprises a submenu displaying additional options for the feature associated with the graphical asset.

15. The method of claim 1 wherein the feature activated through the graphical asset is the display of video annotations associated with the video content.

16. The method of claim 1 wherein the feature activated through the graphical asset is the display of closed captioning associated with the video content.

17. The method of claim 1 wherein the feature activated through the graphical asset is a warp feature that causes the display of files related to the video content.

18. The method of claim 1 wherein the graphical asset toggles between an on state and an off state.

19. The method of claim 1 wherein the feature is closed captioning and the graphical asset includes a submenu for selecting a language in which captions associated with the video content are displayed.

20. A method for delivering a graphical asset to a multimedia player, the method comprising:
    receiving, by a content system from a client device, a request for video content;
    in response to the request for the video content, transmitting, by the content system to client device, a module descriptor for the video content, the module descriptor including an identifier of a graphical asset associated with a feature of a multimedia player supported by the video content, the feature activated through the graphical asset;
    receiving, by the content system from the client device, a request for the graphical asset, the request comprising the identifier of the graphical asset; and
    transmitting, by the content system to the client device, the graphical asset for display through the multimedia player.

21. The method of claim 20 further comprising transmitting the requested video content.

22. The method of claim 20 wherein the module descriptor includes an identifier for a graphical asset database comprising the graphical asset.

23. The method of claim 20 wherein the association between the feature and the graphical asset is provided by a content provider.

24. The method of claim 20 wherein the graphical asset supports a not-available state.

25. The method of claim 20 wherein the graphical asset supports an available-and-off state.

26. The method of claim 20 wherein the graphical asset supports an available-and-on state.

27. The method of claim 20 wherein the graphical asset supports an error state.

28. A method for displaying video content, the method comprising:
    requesting, by a computer system, video content from a content system in response to a user request;
    in response to the request for the video content, receiving, by the computer system, a module descriptor for the video content from the content system;
    determining, by the computer system based on the module descriptor, a feature supported by the video content and an identifier of a graphical asset through which the feature is activated, the feature when activated causes information related to the video content to be displayed to a user;

requesting, by the computer system from the content system, the graphical asset based on the module descriptor;

receiving, by the computer system from the content system, the video content and the graphical asset;

displaying, by the computer system, the video content via a multimedia player that includes the graphical asset; and responsive to the user requesting to activate the feature through the graphical asset, displaying, by the computer system concurrently with the video content, the information related to the video content.

29. A computer program product stored on a non-transitory computer readable storage medium including instructions that when executed cause one or more processors to perform steps comprising:

requesting, by a client device from a content system, video content;

in response to the request for the video content, receiving, by the client device from the content system, a module descriptor for the video content, the module descriptor including an identifier for a graphical asset associated with a feature of a multimedia player supported by the video content, the feature activated through the graphical asset;

requesting, by the client device, the graphical asset from the content system based on the module descriptor;

receiving, by the client device from the content system, the video content and the graphical asset; and displaying, by the client device through the multimedia player, the graphical asset and the video content.

30. A computer program product stored on a non-transitory computer readable storage medium including instructions that when executed cause one or more processors to perform steps comprising:

receiving, by a content system from a client device, a request for video content;

in response to the request for the video content, transmitting, by the content system to client device, a module descriptor for the video content, the module descriptor including an identifier of a graphical asset associated with a feature of a multimedia player supported by the video content, the feature activated through the graphical asset;

receiving, by the content system from the client device, a request for the graphical asset, the request comprising the identifier of the graphical asset; and transmitting, by the content system to the client device, the graphical asset for display through the multimedia player.

\* \* \* \* \*